July 3, 1923.

R. M. LOVEJOY

SHOCK ABSORBER

Filed Nov. 17, 1921

1,460,723

Inventor—
Ralph M. Lovejoy.
By Heard Smith & Tennant.
Attorneys.

Patented July 3, 1923.

1,460,723

UNITED STATES PATENT OFFICE.

RALPH M. LOVEJOY, OF MEREDITH, NEW HAMPSHIRE.

SHOCK ABSORBER.

Application filed November 17, 1921. Serial No. 515,801.

*To all whom it may concern:*

Be it known that I, RALPH M. LOVEJOY, a citizen of the United States, and resident of Meredith, county of Belknap, State of New Hampshire, have invented an Improvement in Shock Absorbers, of which the following description, in connection with the accompanying drawing, is a specification, like characters on the drawing representing like parts.

This invention relates to improvements in shock absorbers for cushioning the movement of two relatively movable members, and the object thereof is to provide a novel and effective relief valve mechanism for permitting a restricted flow of the liquid from one chamber of the shock absorber to another.

While the present invention may be adapted to shock absorbers of various types it is disclosed herein as applied to the type of shock absorber which is disclosed in my prior Patent No. 1,324,913, granted December 16, 1919, which comprises a casing adapted to be connected to one of the relatively movable members having a reservoir and an enclosed cylinder and a piston reciprocable in said cylinder adapted to be connected to the other relatively movable member. In that construction means are provided for permitting a substantially free flow of liquid, such as oil, from the reservoir into the cylinder upon movement of the piston in one direction and means for restricting the flow of liquid from the cylinder into the reservoir upon movement of the piston in the opposite direction.

The present invention contemplates the provision of a novel relief valve mechanism for restricting the flow of liquid from the cylinder in to the reservoir.

The drawing illustrates preferred embodiments of the invention as applied to a shock absorber of the type illustrated in my patent aforesaid.

Figure 1:
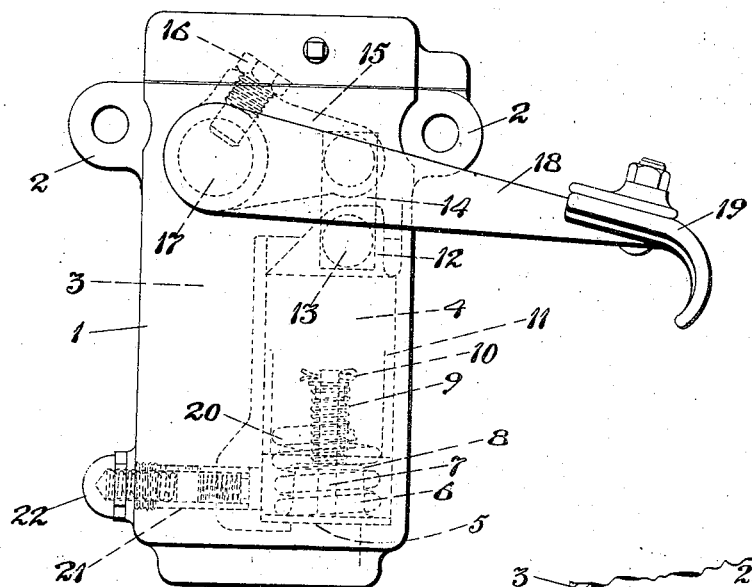
Fig. 1 is a side elevation of a shock absorber embodying the invention.

The shock absorber illustrated in the drawing may be of the general form disclosed in my prior patent comprising a casing 1 having ears 2 adapted to be secured to one of the relatively movable members, such as the frame of an automobile, and having an internal chamber or reservoir 3 to receive a liquid, such as oil, the casing also comprising an internal cylinder 4 having an open upper end communicating with the reservoir and a port 5 through its lower end communicating with said reservoir at the lower end of the casing, all as disclosed in my prior patent. A valve cage 6 rests upon the lower end or head of the cylinder and surrounds the port 5. This valve cage is provided with a central stem 7 upon which a valve 8 is slidably mounted, the valve 8 serving normally to close the port 5 leading from the cylinder into the reservoir. The valve 8 is held upon its seat by a helical spring 9 surrounding the stem 7 and abutting at its lower end against the valve and at its upper end against a cotter pin 10 passing through the stem 7, or any other suitable device for retaining the spring in proper position.

A tubular piston 11 is reciprocably mounted in the cylinder 4 and its closed head is provided with an upwardly extending boss 12 having a suitable journal or a stud 13 which is connected by a link 14 to the free end of an interior arm 15 which is secured by a screw threaded stud 16 to a rock shaft 17 which is suitably journalled in the side walls of the casing. The rock shaft 17 is provided with an exterior arm 18 having at its free end a clamp 19 adapted to be connected to a preferably flexible member which is also connected to the other relatively movable member.

A helical spring 20, preferably seated upon the flange of the valve cage which rests upon the lower end of the cylinder, engages at its upper end the under face of the piston head and tends normally to raise the piston within the cylinder as disclosed in my prior patent aforesaid. Any movement between the relatively movable members, to which the casing 1 and arm 18 are attached, will cause an oscillation of the rock shaft 17 and thereby cause the interior arm 15 of the rock shaft to reciprocate the piston 11 within the cylinder. The spring 9, which acts upon the valve 8, is very light so that the suction caused by the upward movement of the cylinder will raise the valve and draw the liquid through the port into the cylinder. The downward movement of the arm 18, however, will cause the valve immediately to close, thereby trapping the liquid in the cylinder.

The present invention relates to a mechanism for restricting the flow of the liquid from the cylinder into the reservoir and thereby cushioning the downward movement of the arm 18 which in automobile constructions takes place during the rebound of the spring. This mechanism comprises broadly a tubular member which communicates with the cylinder and is provided with a lateral port or ports communicating with the lower part of the reservoir. A valve reciprocably mounted in said tubular member is normally held in position to substantially close the port or ports leading to the reservoir, but is adapted, upon increased pressure upon the liquid within the cylinder, to force the valve longitudinally of the tubular member and thereby increase the effective area of the port so that a restricted amount of the liquid will flow from the cylinder into the reservoir substantially proportional in amount to the pressure imposed upon the liquid in the cylinder by the downward movement of the piston.

In the construction illustrated the relief valve mechanism comprises a tubular member 21 having a closed outer end or head 22 and a screw threaded exterior portion 23 adapted to engage a screw threaded wall of a suitable opening in the casing and an open inner end adapted to fit tightly within a cylindrical aperture 24 in the wall of the cylinder, the lower portion 25 of the cylinder wall preferably being thickened to provide a rigid support for the inner end of the tubular member.

Figure 2:
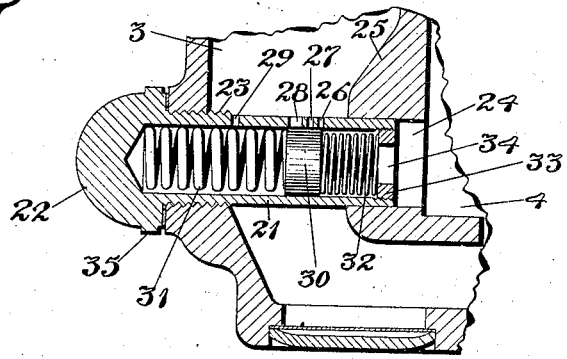
Fig. 2 is a detail vertical sectional view through a portion of the casing of the reservoir and cylinder showing one form of the invention applied thereto; and, Fig. 3 is a similar view illustrating another preferred form of the invention in a similar relation.

The tubular member, in the form illustrated in Fig. 2, is provided with one, or preferably a series of ports 26, 27 and 28 of different size, and also is provided near its head with a vent 29, all of which communicate with the reservoir. A cylindrical valve 30 is slidably fitted within the tubular member and is held in a predetermined relation to the port or ports 26, 27 and 28 by helical springs 31 and 32. The helical spring 31 preferably is interposed between the outer end of the valve and the head 22 of the tubular member, while the spring 32 desirably is a relatively light spring interposed between the inner end of the valve and an annular sleeve 33 screwed into the inner end of the piston. The springs 31 and 32 are of such length as normally to hold the valve 30 in such a position that it will substantially close the port, or where a plurality of ports are employed, as illustrated herein, to close the ports 28 and 27 and partially to close the port 26, the light spring 32 merely acting as a positioning spring for this purpose. When the piston is moved downwardly by a force applied to the arm 18, such as the recoil of a vehicle spring, the increased pressure upon the piston forces the liquid through the aperture 24 in the cylinder wall and the aperture 34 in the sleeve 33, so that it acts against the inner end of the valve 30 and forces it outwardly against the spring 31 first uncovering the port 26 and if the pressure is sufficiently strong eventually uncovering the port 27 and part or all of the port 28, thereby permitting a restricted flow of the liquid from the cylinder into the reservoir. The vent 29 enables such liquid as may be contained in the tubular member between the outer end of the piston and the head 23 to flow into the reservoir so that the movement of the valve is controlled only by the action of the spring 31.

By providing the spring 31 of suitable strength such restricted flow of the liquid from the cylinder into the reservoir, during the downward movement of the piston, may be obtained as properly to cushion the movement of the relatively movable member. Obviously this restricted flow of the liquid may not be dependent alone upon the spring, but also upon the character of liquid employed, for example, any mobile fluids such as light oil will flow much more freely through the ports than a relatively heavy or viscous oil and the strength of the spring required to give a proper regulation to the valve is dependent largely upon the character of liquid employed. However, a spring of proper strength can be quite readily selected to operate properly with suitable oil or other liquid.

One of the advantages of the present construction resides in providing a relief valve mechanism which can be readily removed in order to provide the proper adjustment by the introduction of, or substitution of, the proper spring to co-operate with the liquid employed. This can be done by merely unscrewing the tubular member by applying a wrench to the angular portion 35 of the head and plugging the opening while a new spring is substituted for the one which is found to be undesirable.

Figure 3:
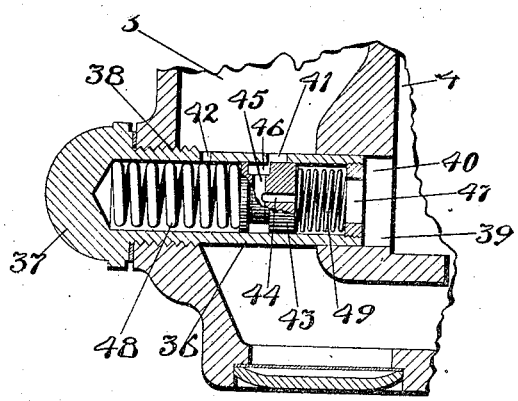

The preferred construction illustrated in Fig. 3 operates upon the same principle as that disclosed in Fig. 2, but differs in details of construction therefrom which enable the device more effectively to absorb slight shocks which produce but a small reciprocation or vibration of the piston. The mechanism for restricting the flow of liquid from the cylinder into the reservoir comprises a tubular member 36 having a closed outer end or head 37 and provided with a screw threaded portion 38 adapted to engage complementary screw threads in the wall of the casing. The inner end of the tubular member fits into an aperture 39 in the cylinder wall and a screw threaded collar 40 is provided at the inner end of the casing. The tubular member is provided with a lateral port 41 which leads to the reservoir and also with a vent opening 42 to permit the liquid to flow from the portion of the tubular member behind the valve into the reservoir. The valve 43 in this construction is of general cylindrical form and fits slidably within the tubular member. It is provided with a central conduit 44 extending longitudinally of the valve and part of the way therethrough and said conduit communicates with a lateral extension 45 which in turn communicates with an annular recess 46 in the periphery of the valve, so that liquid flowing from the cylinder through the aperture 39 in the cylinder wall and the aperture 47 in the collar 40 enters the conduit 44 and passes from it through the lateral extensions thereof into the annular recess 46.

Resilient members, such as helical springs 48 and 49, engaging opposite ends of the valve, normally position the valve in such a manner that the annular recess 46 establishes a slight communication with the port 41 in the tubular member. The helical spring 48 abuts at one end against the valve and at the other end against the head of the tubular member, while the spring 49 is interposed between the inner end of the valve and the collar 40 and serves as a positioning spring to hold the valve in the normal position above described.

In the construction above described, therefore, the valve mechanism is under the control of oppositely disposed springs which, when the fluid pressure is equal in the cylinder and reservoir, establishes a restricted passage from the cylinder to the reservoir. When the piston is moved upwardly upon the compression of the spring of the vehicle the balance of fluid pressure in the cylinder and reservoir is destroyed and a suction created in the cylinder. This suction will move the valve 43 against the pressure of the spring 49 in such a manner as to more fully open the port 41 and thereby permit the liquid to flow through the port 41, the passages 46, 45 and 44 in the valve into the cylinder. As soon as an equilibrium of pressure in the cylinder and reservoir is again established the spring 49 will return the valve 43 to its normal position as illustrated in Fig. 3 providing a restricted passageway from the cylinder to the reservoir. Upon the downward or compression movement of the piston the liquid in the cylinder will be forced in the opposite direction through the passages 44, 45 and 46 and the restricted opening of the port 41 and under slight movements of the piston this operation of the valve will serve effectively to absorb the slight shocks. When, however, a vigorous downward movement of the piston takes place the valve 43 is forced bodily outwardly against the spring 48 and across the port 41 so that the liquid may flow past the end of the valve through the port 41, the port being opened in proportion to the pressure imposed by the piston upon the liquid. The vent 42 relieves the pressure of the liquid which is contained in the portion of the tubular member in which the spring 48 is seated so that in this construction, as in that illustrated in Fig. 2, the movement of the valve is controlled only by the spring.

In this construction the liquid in passing through the conduit 44, its extensions 45 and the port 41, follows a sinuous path which impedes the flow of the liquid so that the device cushions the lighter movements of the arm 18, whereas the more vigorous movements of said arm are cushioned by the restriction of the flow of liquid from the cylinder into the reservoir by the bodily movement of the valve which causes its inner end to pass more or less across the port 41 and thereby vary the effective area of the port in correlation to the pressure imposed upon the liquid by the piston.

It will thus be seen that in the construction above described the small opening movement of the valve mechanism is controlled by the light spring to permit a normal restricted passage from the cylinder to the reservoir and that a greater opening of the valve mechanism is controlled by the relatively heavy spring in response to movements of the piston under heavy shocks.

It will be understood that the embodiments of the invention disclosed herein are of an illustrative character and are not restrictive and that various modifications in construction, design and arrangement of parts may be made within the scope of the following claims. It will also be understood that the means for restricting the passage of liquid between the cylinder or compression chamber of the shock absorber and reservoir may be employed in other types of shock absorbers than that herein illustrated within the spirit and scope of the claims.

Having thus described my invention, what I claim as new, and desire to secure by Letters Patent, is:

1. A shock absorber for cushioning the movement of two relatively movable members comprising a casing adapted to be secured to one of said members presenting a reservoir, a cylinder, a piston reciprocable in the cylinder and means for causing said piston to act upon the other relatively movable member, a tubular conduit communicating with said cylinder and reservoir having a port, valve mechanism mounted in said tubular member in co-operative relation to said port, oppositely disposed light and heavy springs controlling the movement of said valve mechanism acting normally to provide a small opening of said port when controlled by the light spring to cushion slight movements of the piston produced by slight shocks and acting to produce a greater opening of said port when controlled by said heavy spring to cushion the more extended movements of said piston caused by heavier shocks.

2. A shock absorber for cushioning the movement of two relatively movable members comprising a casing adapted to be secured to one of said members presenting a liquid reservoir and a cylinder, a piston reciprocable in said cylinder, means for connecting said piston to the other relatively movable member and means for establishing a substantially free flow of the liquid from said liquid reservoir into said cylinder in response to the movement of the piston in one direction, a tubular member communicating with said cylinder and having a port communicating with said reservoir, a valve slidably mounted in said tubular member in co-operative relation to said port, springs of different strength, engaging opposite ends of said valve, acting normally to hold said valve in a predetermined relation to said port, but yieldable in response to increased pressure upon the liquid in said cylinder to increase the effective area of the port.

3. A shock absorber for cushioning the movement of two relatively movable members comprising a casing adapted to be secured to one of said members presenting a liquid reservoir and a cylinder, a piston reciprocable in said cylinder, means for connecting said piston to the other relatively movable member and means for establishing a substantially free flow of the liquid from said liquid reservoir into said cylinder in response to the movement of the piston in one direction, a tubular member communicating with said cylinder and having a port communicating with said reservoir, a valve slidably mounted in said tubular member in co-operatve relation to said port, a helical spring engaging the outer end of said valve and a relatively light helical positioning spring engaging the inner end of said valve, said outer spring being yieldable in response to increased pressure upon the liquid in said cylinder to increase the effective area of the port.

4. A shock absorber for cushioning the movement of two relatively movable members comprising a casing adapted to be secured to one of said members presenting a liquid reservoir and a cylinder, a piston reciprocable in said cylinder, means for connecting said piston to the other relatively movable member and means for establishing a substantially free flow of the liquid from said liquid reservoir into said cylinder in response to the movement of the piston in one direction, a tubular member communicating with said cylinder and having a port communicating with said reservoir, a valve slidably mounted in said tubular member in co-operative relation to said port, having a central conduit and an annular peripheral groove normally communicating with said conduit and said port, a spring engaging the outer end of said valve and a relatively light spring engaging the inner end of said valve, acting to retain said valve in normal position, said outer spring being yieldable in response to increased pressure upon the liquid in said cylinder whereby said valve will be forced across said port and the effective area of the port increased.

5. In a shock absorber having a liquid reservoir, a cylinder having a piston reciprocable therein and means for establishing a substantially free flow of the liquid from said reservoir into the cylinder when the piston is moved in one direction, a valve mechanism comprising a tubular member communicating with the cylinder and having a port communicating with said reservoir, a valve reciprocable in said tubular member, resilient means normally retaining said valve in a predetermined relation to said port, yieldable in response to increased pressure of the liquid when the piston is moved in the opposite direction to increase the effective area of said port.

6. In a shock absorber having a liquid reservoir, a cylinder having a piston reciprocable therein and means for establishing a substantially free flow of the liquid from said reserovir into the cylinder when the piston is moved in one direction, a valve mechanism comprising a tubular member having a closed head and an open inner end to communicate with said cylinder and a lateral port to communicate with said reservoir, and a screw threaded portion to engage the wall of said reservoir, a valve reciprocable in said tubular member, a spring seated on said head engaging said valve and a positioning spring engaging the opposite end of said valve acting to hold the same in a predetermined relation to said port, said outer spring being yieldable in response to increased pressure upon the liquid when the piston is moved in the opposite direction to increase the effective area of said port.

7. In a shock absorber having a liquid reservoir, a cylinder having a piston reciprocable therein and means for establishing a substantially free flow of the liquid from said reservoir into the cylinder when the piston is moved in one direction, a valve mechanism comprising a tubular member having a closed head and an open inner end to communicate with said cylinder and a lateral port to communicate with said liquid reservoir and a screw threaded portion to engage the wall of said reservoir, a valve slidably mounted in said tubular member having a longitudinal conduit extending partway therethrough, and an annular peripheral recess communicating with said conduit, outer and inner springs engaging the opposite ends of said valve acting normally to hold said annular recess in co-operative relation to said port, said outer spring being yieldable in response to increased pressure upon the liquid in said cylinder when the piston is moved in the opposite direction, whereby said valve will be forced across said port and the effective area of the port increased.

8. In a shock absorber having a liquid reservoir, a cylinder and a piston reciprocable therein, a tubular conduit leading from said cylinder to said reservoir, valve mechanism in said conduit under the control of oppositely disposed light and heavy springs operable against the light spring upon the suction stroke of the piston to admit liquid to the cylinder and operable upon the compression stroke of said piston against said heavy spring to offer resistance to the descent of the piston in correlation to the pressure imposed upon the piston.

9. In a shock absorber having a liquid reservoir, a cylinder and a piston reciprocable therein, a tubular conduit leading from said cylinder to said reservoir, valve mechanism in said conduit under the control of oppositely disposed light and heavy helical springs operable against the light helical spring upon the suction stroke of the piston to admit liquid to the cylinder and operable upon the compression stroke of said piston against said heavy helical spring to offer resistance to the descent of the piston in correlation to the pressure imposed upon the piston.

10. In a shock absorber having a liquid reservoir, a cylinder and a piston reciprocable therein comprising a tubular conduit leading from said cylinder to said reservoir, valve mechanism in said conduit under the control of oppositely disposed light and heavy springs normally providing a restricted passage from said cylinder to said conduit operable against the light spring, upon the suction stroke of the piston, to admit liquid to said cylinder and acting upon slight compression movements of said piston to provide a restricted passage from said cylinder to said piston and movable against said heavy spring in response to increased pressure by the piston upon the liquid in said cylinder to increase the effective area of the port.

In testimony whereof, I have signed my name to this specification.

RALPH M. LOVEJOY.